Dec. 6, 1955    L. MACARDIER    2,726,182
PROCESS FOR THE REINFORCEMENT OF THE INSULATION IN
SITU OF THE EXTREMITIES OF HIGH-TENSION CABLES
Filed June 28, 1952

INVENTOR.
LOUIS MACARDIER
BY
ATTORNEYS

United States Patent Office

2,726,182
Patented Dec. 6, 1955

2,726,182

PROCESS FOR THE REINFORCEMENT OF THE INSULATION IN SITU OF THE EXTREMITIES OF HIGH-TENSION CABLES

Louis Macardier, Lyon, France, assignor to Compagnie Generale d'Electricite, Paris, France, a corporation of France Application June 28, 1952, Serial No. 296,205

Claims priority, application France April 16, 1947

5 Claims. (Cl. 154—2.21)

This invention relates to a process for the reinforcement of the insulation in situ of the extremities of high-tension cables which include a conductor and is a division of my co-pending application No. 20,886 filed April 14, 1948 (now abandoned).

The insulation at the ends of high-tension cables is always reinforced for the purpose of increasing the dielectric strength in the vicinity of the edge of the lead covering of the cable and over the length of the insulation located within the terminal box. Such reinforcement of the insulation is generally carried out in situ at the time when the cable is connected and requires a great amount of care and time. It has been endeavored to achieve the same results under better conditions by constructing in the factory insulating ducts of paper treated with bakelite, which are passed over the insulation at the end of the cable. The results were not satisfactory owing to the defective electrical properties of paper treated in this manner. For this reason, the manufacture of the reinforcement of the insulation in the factory has been almost completely abandoned and the impregnated paper windings constituting the said reinforcement are now formed either manually or by means of a machine at the time when the cable is connected.

The invention relates to a high-tension cable end, the insulation of which is reinforced by a prefabricated insulating duct or bushing which is fitted over the end of the cable insulation at the time when the cable is connected, the said cable end being characterized by the fact that the said insulating duct is obtained by winding previously impregnated paper, or preferably dry paper, on a cylindrical central channel.

The invention comprises in addition a number of characteristic features which will be explained in the course of the following description with reference to the accompanying drawings.

Figure 1:
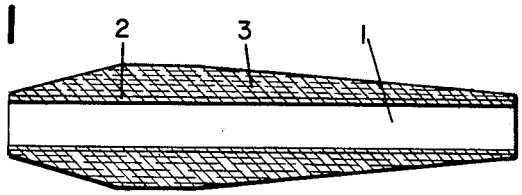
Figure 1 is a longitudinal section of a prefabricated insulating duct or bushing used in practicing the invention.

Referring now to the drawings and first to Figure 1, the latter shows a prefabricated insulating duct or bushing. 1 is the cylindrical central channel of the duct, which is obtained by winding about a removable mandrel a number of turns of a paper band, the width of which is equal to the height of the duct. In this way, the tube 2 is formed, on which strips of paper of lesser width and of sufficient thickness are helically wound, either manually or by means of a machine, until the diameter reaches the size required for the reinforcement of the insulation of the cable in accordance with the operating tension. The section of the paper winding is generally that of a double frustum of a cone, which affords sufficient resistance to the forces set up by the electric field. This paper winding constituting the reinforcement for the insulation is designated by 3.

The windings 2 and 3 can be formed of dry or previously impregnated paper. It is preferable to employ dry paper, which subsequently permits of a more thorough drying of the insulation, since the insulation is never completely dry when previously impregnated paper is employed.

The winding 3 may, if desired, be of the condenser type, that is to say, it may comprise intermediate conductive coatings which enable the capacity and consequently the force set up by the electrical field to be distributed. These conductive coatings may comprise conductive strips 4 intercalated with the strips of winding 3.

According to the invention, the winding 3 may be formed of very thin paper, for example of rag paper in which flax pulp is incorporated, which is of a thickness of less than 0.04 mm. in the vicinity of the tube 2 and, if the winding is of the condenser type, also between the conductive coatings.

The prefabrication of the insulating duct comprises, in accordance with the invention, drying and impregnation of the insulating winding. These operations take place in a tank as in the manufacture of a cable, the insulating duct being passed over a mandrel which conforms to the shape of the channel 1.

For despatch to the site, the insulating duct, together with the mandrel, is placed in an air-tight box filled with dried degassed oil.

Figure 2:
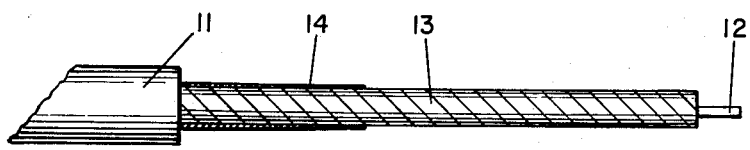
Figure 2 is a partially broken away view of a cable end illustrating the manner of its preparation in situ in accordance with the method of this invention for mounting thereon the bushing of Figure 1.

Figure 2 of the accompanying drawings shows the method of preparing the insulation at the end of the cable in situ at the time of laying in order that the insulating duct shown in Figure 1 may be fitted thereon. As will be seen from this figure, the lead covering 11 of the cable is cut to the necessary distance from the end of the conductor 12 so as to expose the insulation 13 over a suitable length. A number of turns of impregnated paper strips are then wound over the insulation of the cable at 14 so as to have a conical section. The thickness at the base of this winding does not exceed about 1 mm. for the largest ends.

Owing to this conical portion, the clearance left between the cable insulation and the duct when the said duct is passed over the cable, while being sufficient at the right-hand portion to permit ready fitting together, is reduced to a minimum at the left-hand portion where the radial potential gradient is highest. In the right-hand portion, the radial potential gradient decreases progressively in the direction from left to right. The gap between the cable insulation and the duct, which is filled with oil after assembly, can withstand the force due to the electrical field without danger of deterioration.

Figure 3:
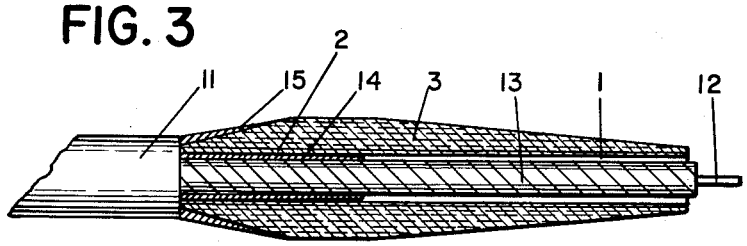
Figure 3 is a view of the cable end of Figure 2 to which the bushing of Figure 1 has been applied.
Figure 4:
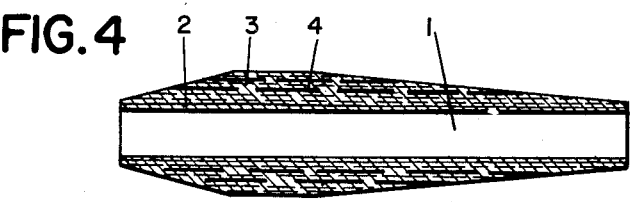
Figure 4 is a view similar to Figure 1 of a modified type of duct or bushing useful in practicing the invention.

Figure 3 shows the end of the cable after the fitting of the insulating duct in situ. The reference numerals in this figure designate the same elements as the reference numerals in Figures 1 and 2. To complete the terminal box, it is then merely necessary to fit the usual screen 15 and to place in position the metal part and the porcelain mounted thereon in order to obtain the complete terminal box.

The cable ends formed in accordance with the invention afford the advantage that they can be very rapidly assembled in situ, whereby a considerable saving of labor is effected. The preconstruction of the insulating duct takes place under good working conditions unaffected by the weather, and in addition machines can be more readily employed for winding the paper in the factory than on the site. Furthermore, non-impregnated paper can be employed to form the reinforcement for the insulation, which affords a possibility of better drying and perfect impregnation.

The results obtained in tests carried out with cable ends prepared in accordance with the invention have been found at least equivalent to those normally obtained with ends reinforced in situ by the usual methods.

I claim:

1. A process for the reinforcement of the insulation in situ of the extremity of a high voltage cable which has a conductor, an insulation surrounding the conductor and a protecting sheath covering the insulation, consisting of the steps of cutting and removing the sheath at an end of the cable for a determined length so as to bare the insulation at said end of said cable for such length, winding turns of paper about the bared insulation of the cable to form a slightly tapered profile portion on at least a part of the bared insulation starting from the end of the sheath adjacent the bared insulation with the taper directed from said end of the sheath toward the extremity of the bared insulation, and forcing upon the tapered profile portion and into abutment with said end of said sheath a bushing that has been impregnated in all its mass, with dried and degassed oil, said bushing comprising several internal superimposed layers of paper whose width is a little shorter than the length of the bared insulation of the cable and over which internal superimposed layers of paper a paper strip of a lesser width has been helicoidally wound into required profile configuration of the bushing.

2. A process for the reinforcement of insulation in situ of the extremity of a high voltage cable which has a conductor, an insulation surrounding the conductor and a protecting sheath covering the insulation, consisting of the steps of cutting and removing the sheath at an end of the cable for a determined length so as to bare the insulation at said end of said cable for said length, winding a number of turns of impregnated paper strip over the bared insulation to form a slightly tapered portion on said bared insulation starting from the end of the sheath adjacent the bared insulation and whose taper is directed from the said end of the sheath toward the outer extremity of the bared insulation, providing a bushing that has been impregnated in all its mass, with dried and degassed oil, said bushing comprising several internal superimposed layers of paper band wound helically into tubular form and having a width that is substantially the length of said bushing which latter is slightly shorter than the length of the bared insulation of said cable and over which internal superimposed layers of paper a paper band of lesser width has been wound helicoidally to impart a reversely tapered profile configuration to the bushing, and mounting said bushing with a force fit upon said tapered portion provided on said bared insulation so that one end of said bushing is directly adjacent said end of said sheath, and the other end of said bushing terminates adjacent the extremity of the bared insulation.

3. A process according to claim 1 wherein the helicoidally wound paper strip of the bushing has a thickness which is less than 0.04 mm.

4. A process according to claim 2, wherein the thickness of the winding of said number of turns of impregnated paper strip over the bared insulation adjacent the cut end of the sheath does not exceed approximately 1 mm.

5. A process according to claim 2, wherein the helicoidally wound paper band of the bushing has conductive strips intercalated to provide a condenser effect.

References Cited in the file of this patent

UNITED STATES PATENTS

| | | |
|---|---|---|
| 1,987,971 | Peterson | Jan. 15, 1935 |
| 2,181,035 | White | Nov. 21, 1939 |
| 2,222,718 | Phillips | Nov. 26, 1940 |
| 2,355,545 | Meyerhans | Aug. 8, 1944 |
| 2,523,313 | Lee | Sept. 26, 1950 |
| 2,550,453 | Coggeshall | Apr. 24, 1951 |
| 2,577,715 | Rheiner | Dec. 4, 1951 |

FOREIGN PATENTS

| | | |
|---|---|---|
| 452,396 | Great Britain | of 1936 |